United States Patent
Yachi et al.

[11] Patent Number: 5,996,410
[45] Date of Patent: Dec. 7, 1999

[54] TUNING FORK TYPE VIBRATION GYRO

[75] Inventors: Masanori Yachi; Hiroshi Ishikawa; Yoshio Satoh, all of Kawasaki; Kazutsugu Kikuchi, Yokohama, all of Japan

[73] Assignees: Fujitsu Limited, Kawasaki; Fujitsu Towa Electron Limited, Yokohama, both of Japan

[21] Appl. No.: 09/013,942

[22] Filed: Jan. 27, 1998

[30] Foreign Application Priority Data

Aug. 22, 1997 [JP] Japan .................................. 9-226752

[51] Int. Cl.⁶ .................................................... G01C 19/00
[52] U.S. Cl. ............................................................ 73/504.16
[58] Field of Search ........................... 73/504.16, 504.12, 73/504.02

[56] References Cited

U.S. PATENT DOCUMENTS 5,329,816  7/1994  Söderkvist et al. .................. 73/504.16
5,854,427  12/1998  Terada et al. ......................... 73/504.16

FOREIGN PATENT DOCUMENTS 61-294311  12/1986  Japan .

*Primary Examiner*—Richard A. Moller
*Attorney, Agent, or Firm*—Armstrong, Westerman, Hattori, McLeland & Naughton

[57] ABSTRACT

The shape of drive electrodes and/or the shape of detection electrodes of a tuning fork type vibration gyro are made asymmetrical between the inside and outside of the arm, and between the surface and reverse face of the arm, to reduce the abnormal vibration and leaking output. The drive electrodes to be provided on the inside parts of the surface and reverse face of the first arm are formed smaller than the drive electrodes to be provided on the outside parts of the surface and reverse face thereof. The length of the detection electrode to be provided on the outside lateral face of the second arm is formed short. The drive electrodes to be provided on the surface and reverse face of the first arm are extended to the base side from the boundary position between the first arm and the base, and the detection electrodes to be provided on the surface and reverse face of the second arm are extended to the base side from the boundary position between the second arm and the base.

7 Claims, 32 Drawing Sheets fy MODE
VIBRATION fx MODE
VIBRATION (y<z)

fx MODE VIBRATION

FIG. 21A   FIG. 21B
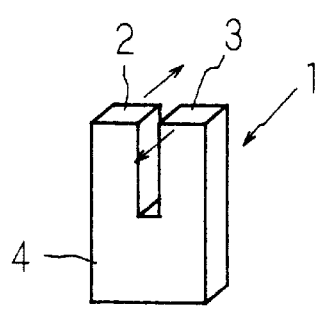
fy MODE
VIBRATION
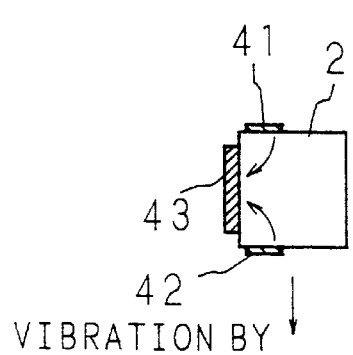
VIBRATION BY
CORIOLIS
FORCE
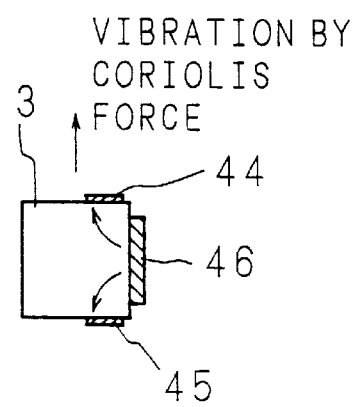
VIBRATION BY
CORIOLIS
FORCE

TUNING FORK TYPE VIBRATION GYRO

BACKGROUND OF THE INVENTION

1. Field of the Invention

The present invention relates to a gyro for detecting the rotation angular velocity, more particularly, to a tuning fork type vibration gyro utilizing 1 piezoelectric element.

2. Description of the Related Art

Gyroscopes have been used as means for identifying the position of moving objects such as airplane, large vessels, space satellites, and the like. Recently, they have been utilized for detecting vibration of apparatus such as car navigation, VTR, still camera, and the like in civil field.

Among such gyroscopes, a vibration gyro made by utilizing a piezoelectric element has been in practical use. The piezoelectric vibration gyro is made by utilizing the principle that, when a rotation angular velocity is exerted upon an object which is vibrating at a predetermined rate, Coriolis force is formed in a direction orthogonal direction to the direction of vibration. Various types of such piezoelectric vibration gyros have been proposed. Above all, recently, research and development of a tuning fork type vibration gyro utilizing the piezoelectric monocrystal such as $LiTaO_3$, $LiNbO_3$, etc. have been vigorously pursued.

The tuning fork type vibration gyro has a constitution comprising two arms formed in one-piece in a piezoelectric monocrystal and a base supporting the two arms, and having a constitution comprising a drive electrode provided on the arm for driving the tuning fork vibration and a detection electrode provided on the arm for detecting the rotation angular velocity. This tuning fork type vibration gyro is classified into the following two types according to the installation pattern of the drive electrode and detection electrode. One type is that a drive electrode is provided on one arm and a detection electrode on the other arm (hereinafter, this type is called asymmetric type). The other type is that both a drive electrode and a detection electrode are provided on the respective arms, and the electrode installations in both arms are symmetric thereinafter, this type is called a symmetric type).

This tuning fork type vibration gyro is advantageous in the points of small size, light weight, and low cost in comparison with other gyros of coma gyro, optical gyro, etc., but is inferior to other gyros in respect to measuring precision. Therefore, improvement of measuring precision, i.e., improvement of S/N ratio, is desired in the tuning fork type vibration gyro.

In the asymmetric type tuning fork type vibration gyro referred to above, the drive electrode and the detection. electrode are provided respectively on the separate arms. For this reason, abnormal vibration is generated and a potential difference causing noise is detected. Another problematic point is unnecessary output (leaking output) attributed to the mechanical coupling and electrostatic coupling between the arm provided with a drive electrode and the arm provided with a detection electrode. On the other hand, in the symmetric type tuning fork type vibration gyro referred to above, such abnormal vibration can be prevented, and leaking output is also small, but there are problems such that the capacity ratio is high and the detection sensitivity is small.

BRIEF SUMMARY OF THE INVENTION

The principal object of the present invention is to provide a tuning fork type vibration gyro with which S/N ratio can be improved in comparison with the prior art gyro.

In the asymmetric type tuning fork type vibration gyro of the present invention, the shapes of detection electrodes are made asymmetric between the surface and reverse face and the lateral side of the arm, and the amounts of the electric charges to be generated on the detection electrodes in drive vibration are mutually offset and the leaking output is suppressed. Also, the shapes of drive electrodes on the inside and outside of the arm, and on the surface and reverse face of the arm are made asymmetric to suppress abnormal vibration. By adopting the asymmetric shape of detection electrode and/or drive electrode as above, noise signal (N component) is decreased. Furthermore, by extending the drive electrode and/or the detection electrode to the base side, the drive efficiency of the drive electrode and/or the detection efficiency of the detection electrode are enlarged to increase the detection signal (S component).

In the symmetric type tuning fork type vibration gyro of the present invention, the noise signal (N component) is originally small, and therefore, by extending the drive electrode and/or the detection electrode to the base side, the drive efficiency of the drive electrode and/or the detection efficiency of the detection electrode are enlarged to increase the detection signal (S component).

According to the tuning fork type vibration gyro of the present invention, the shapes of the drive electrode and/or the detection electrode on the inside and outside of the arm, and on the surface and reverse face of the arm are made asymmetric, so that the abnormal vibration and leaking output can be made smaller than those of prior art gyro. As the drive electrode and/or the detection electrode are formed by concentrating on the zone in the vicinity of the boundary part between the arm and the base, the capacity ratio of the drive electrode and/or the detection electrode is reduced, thereby making it possible to improve the drive efficiency and/or detection efficiency in comparison with prior art gyro.

The above and further objects and features of the invention will more fully be apparent from the following detailed description with accompanying drawings.

BRIEF DESCRIPTION OF THE SEVERAL VIEWS OF THE DRAWINGS

FIG. 21A, 21B are explanatory views of the electrode constitution four inducing plane-vertical vibration (detection vibration);

DETAILED DESCRIPTION OF THE INVENTION

Hereinafter, the present invention is concretely explained with reference to the drawings showing the embodiments thereof.

(Asymmetric type tuning fork type vibration gyro)

Figure 3C:
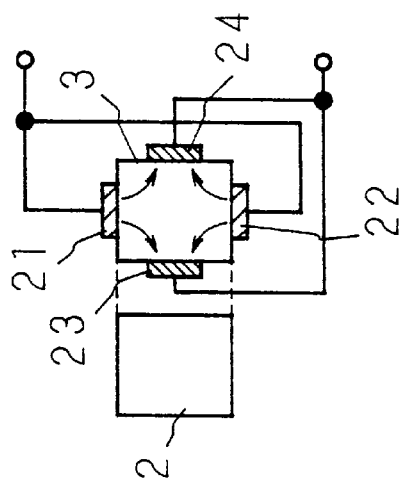
FIGS. 3A–3C are explanatory views of the electrode constitution for inducing plane-vertical vibration (detection vibration)
Figure 3B:
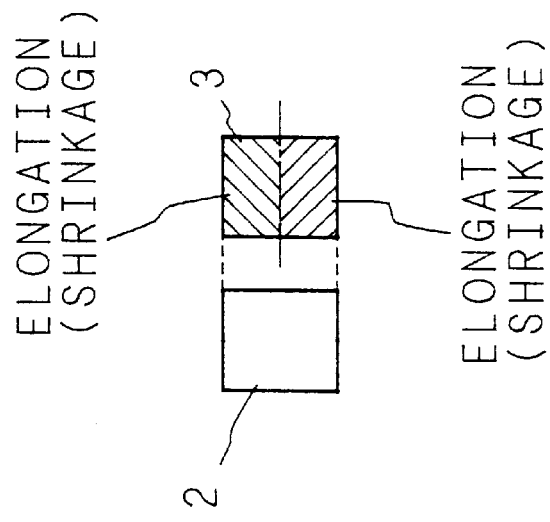
Figure 3A:
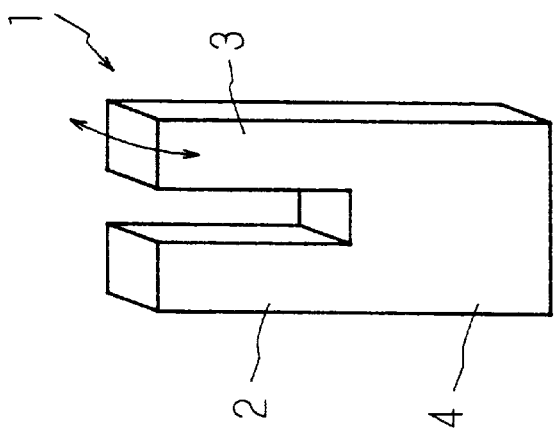
Figure 4:
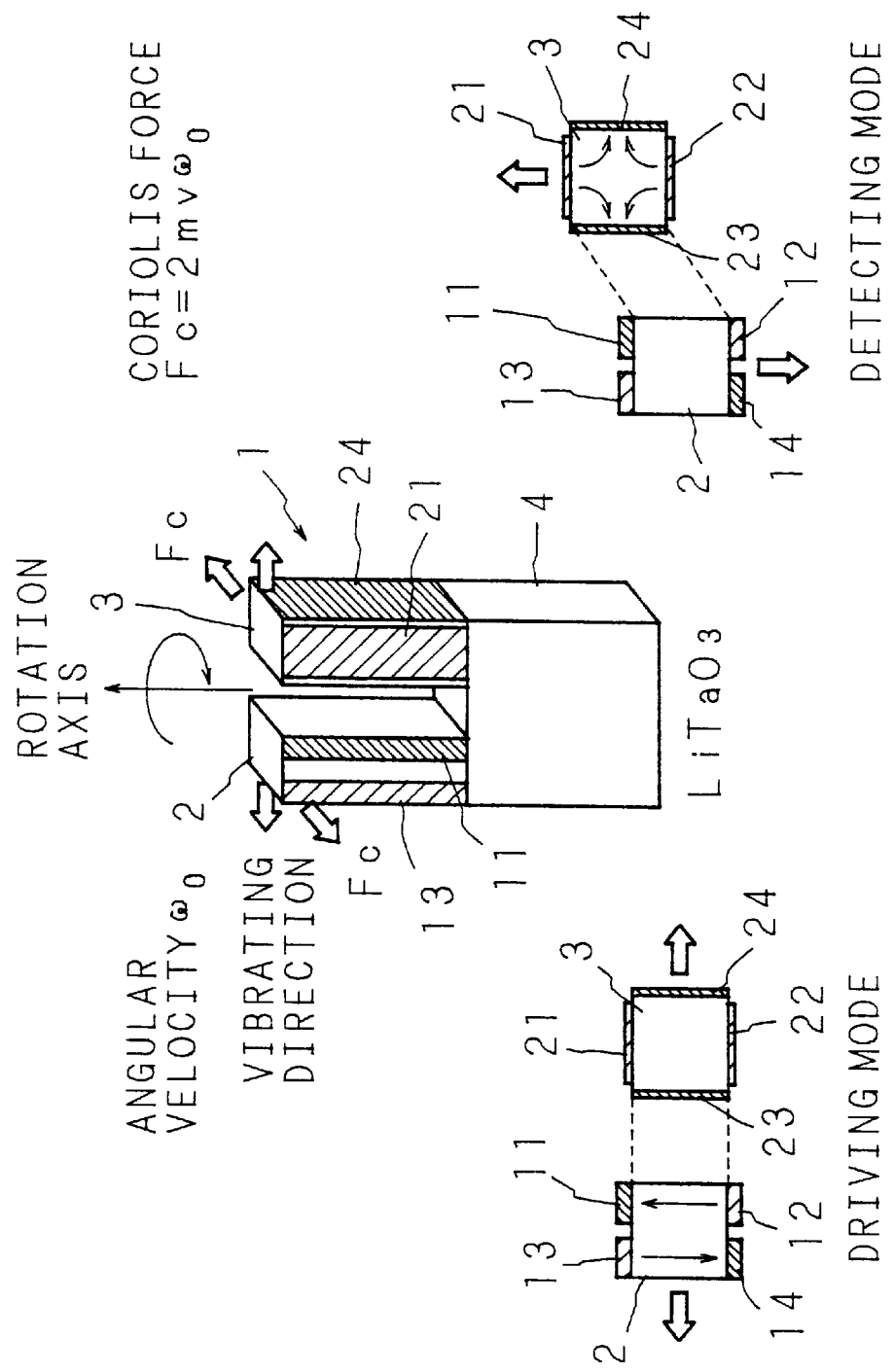
FIG. 4 is a constitution view of asymmetric type tuning fork type vibration gyro.

At first, with respect to the general constitution and detection principle in the asymmetric type tuning fork type vibration gyro, explanation is given by using FIGS. 1 to 4. FIG. 1 is a view to show the vibration of the tuning fork type vibration member, FIGS. 2 and 3 are views to show the electrode constitution, and FIG. 4 is a view to show the concrete electrode pattern.

Figure 1A:
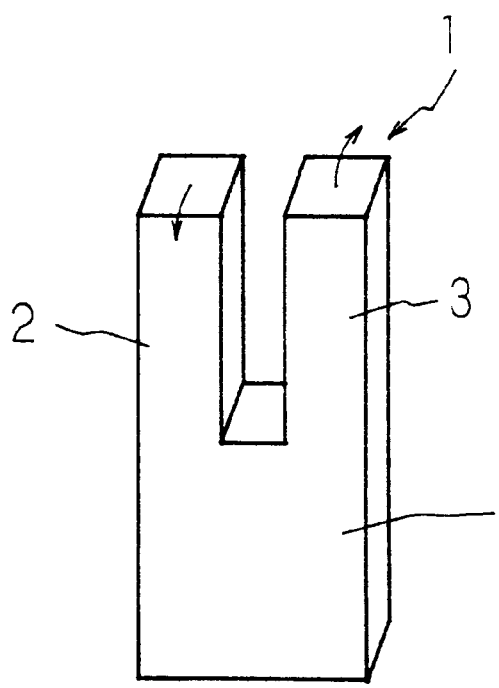
FIGS. 1A, 1B are explanatory views on the tuning fork vibration.
Figure 1B:
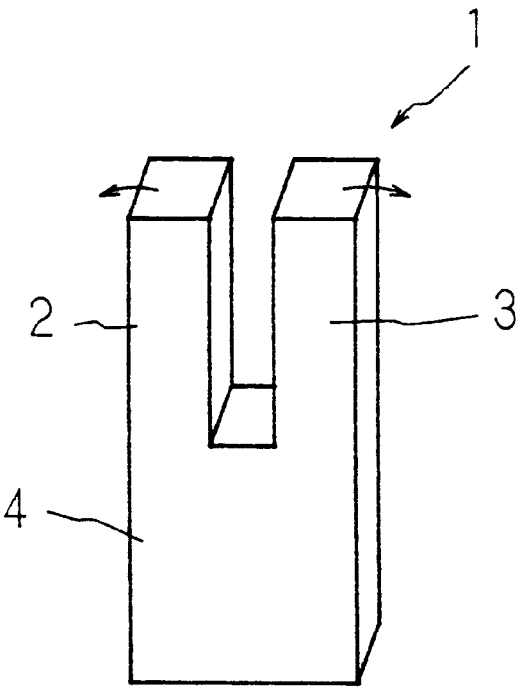

The tuning fork type vibration member 1 has two arms 2, 3 of rectangular parallelepiped form having square bottom face and a base 4 of rectangular parallelepiped form supporting the two arms 2, 3. These arms 2, 3 and base 4 are constituted in one piece by a piezoelectric monocrystal. As shown in FIGS. 1A, 1B, the tuning fork type vibration member 1 includes two kinds of vibration, i.e., fy mode vibration (plane-vertical vibration) and fx mode vibration (in-plane vibration). In the asymmetric type tuning fork type vibration gyro, there is such constitution as to detect the output by Coriolis force by driving the tuning fork type vibration member 1 by fx mode vibration (drive vibration mode), and carrying out detection by fy mode vibration (detection vibration mode).

Figure 2C:
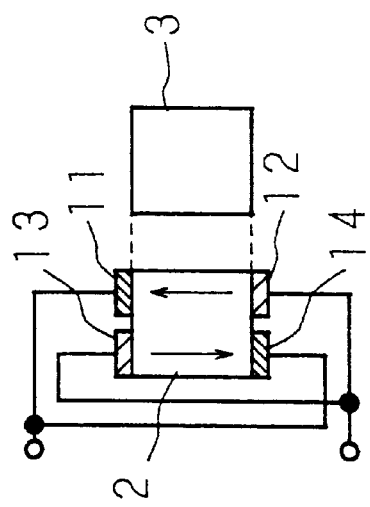
FIGS. 2A–2C are explanatory views of the electrode constitution for inducing in-plane vibration (drive vibration)
Figure 2B:
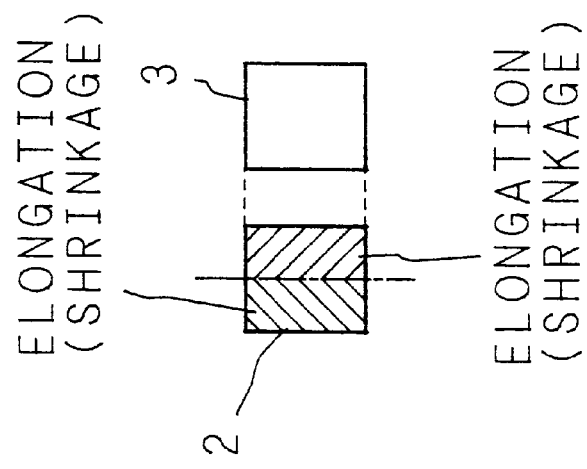
Figure 2A:
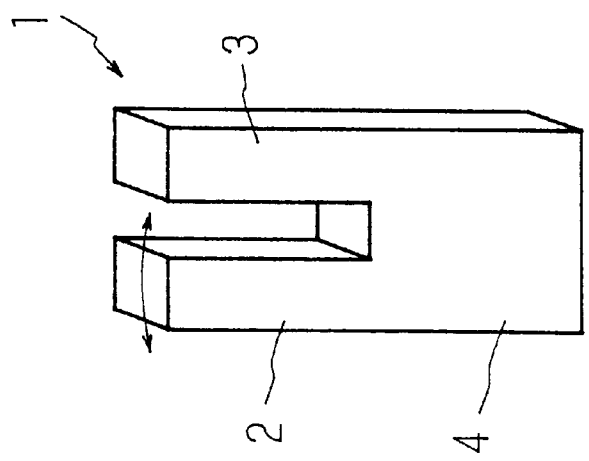

FIG. 2 is a view to illustrate the electrode for driving the fx mode vibration (FIG. 2A). The fx mode vibration is based on the flexural oscillation. As shown in FIG. 2B, one arm 2 is vertically divided into two parts in the direction orthogonal to the direction of the fx mode vibration, and a voltage is applied to the arm 2 so that when one part is elongated the other part is constricted. The electrode constitution in this case is as shown in FIG. 2C, wherein the arm 2 is provided with the drive electrodes 11, 12, 13 and 14. In the drawing, the two arrow marks show the directions of the electric fields to be formed by applying drive voltage to the corresponding electrodes.

FIG. 3 is a view to illustrate the electrode for detecting the fy mode vibration (FIG. 3A). In the same manner as in the fx mode vibration, the fy mode vibration is also based on the flexural oscillation. As shown in FIG. 3B, when the other arm 3 is vertically divided into two parts in the direction orthogonal to the direction of the fy mode a vibration, in case of one part elongating, the other part is shrunk. Accordingly, by providing the drive electrodes 21, 22, 23 and 24 to this arm 3 as shown in FIG. 3C, the voltage to the fy mode vibration can be detected.

By the principles described above, the general constitution of the asymmetric type tuning fork type vibration gyro becomes as in FIG. 4. The tuning fork type vibration member 1 which is a tuning fork type vibration gyro of the present invention has two arms 2, 3 and a base 4 which are constituted in one-piece by $LiTaO_3$. On the surface and the reverse face of one arm 2, there are provided two sets of inside and outside drive electrodes 11, 12, 13, 14 for driving the above fx mode vibration (inside set of electrodes being constituted by the drive electrodes 11, 12, and outside set of electrodes being constituted by the drive electrodes 13, 14). Also, on the surface, reverse face, inside lateral face, and outside lateral face of the other arm 3, there are provided the detection electrodes 21, 22, 23, 24 for detecting the above fy mode vibration. The detection electrodes 21, 22 are electrically short-circuited, and the detection electrodes 23, 24 are electrically short-circuited (ref. FIG. 3C).

Figure 5:
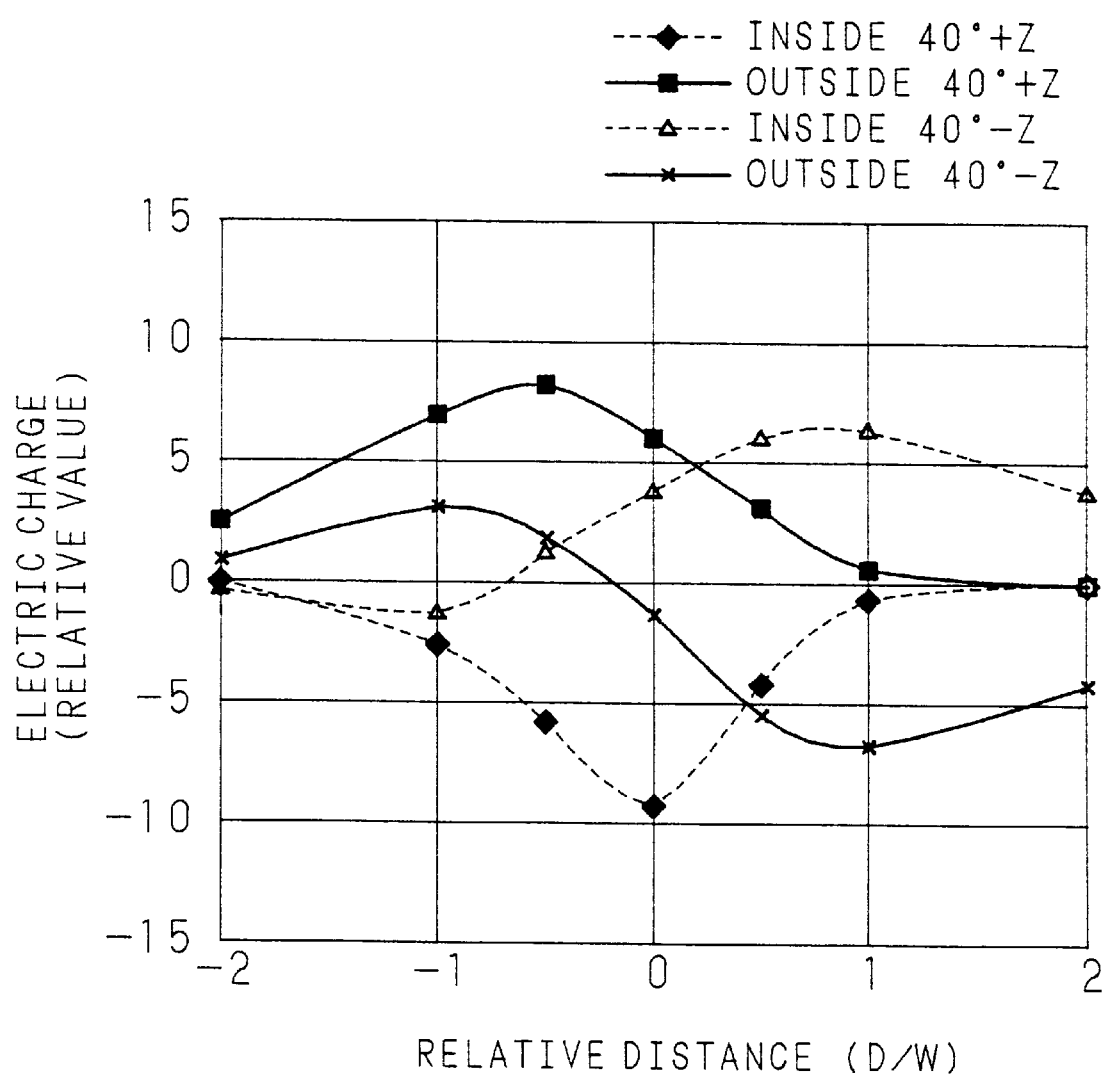
FIG. 5 is a graph showing the electric charge distribution at the time of the drive vibration.
Figure 6A:
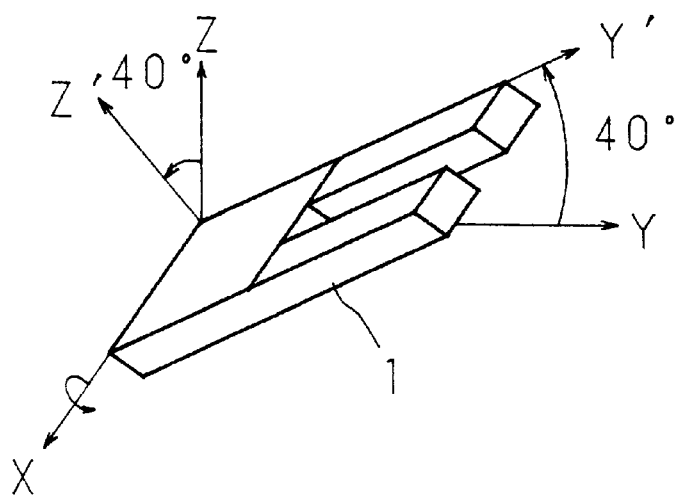
FIG. 6A is a view to show the crystal orientation of the piezoelectric monocrystal.

FIG. 5 is a graph showing the results of analysis by finite element method of the electric charge components generated by the drive vibration to the tuning fork type vibration member 1 having the crystal orientation as shown in FIG. 6A. As shown in FIG. 6A, the tuning fork type vibration member 1 is an $LiTaO_3$ monocrystal 40° rotary Z plate (130° rotary Y plate) having the axis X as a rotation axis, and is an element wherein the arms 2, 3 extend in the direction of Y'. The $LiTaO_3$ monocrystal may not necessarily be limited to the 40° rotary Z plate but 40°±20° rotary Z plate may be used. The surface in the arms 2, 3 denotes the face on which the polarization axial direction is + direction, and the reverse face is in − direction.

Figure 6B:
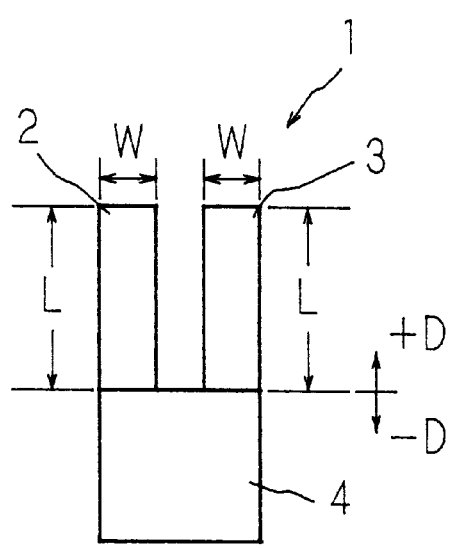
FIG. 6B is a view to show the size of the tuning fork type vibration gyro.

Alternatively, as shown in FIG. 6B, the width of the arms 2, 3 is W (about 1 mm), and the length of the arms 2, 3 is L (about 7 mm). In FIG. 5, the charge distribution in the respective drive electrodes 11, 12, 13, 14 in drive vibration is shown, in which the abscissa shows a distance based on the boundary position between the arms 2,3 and the base 4, and the ordinate represents the electric charge (relative value).

From the results of FIG. 5, in the constitution installing the drive electrode only on the arm 2, it can be seen that the electric charge components differ between the inside and the outside, and between the surface and the reverse face, of the arm 2. Accordingly, in such a case, when a detection electrode of the same shape is installed on the four faces of the other arm 3, the charge components of the drive vibration is also to be detected to make the errors large. Therefore, by making the detection electrode asymmetric shape between the inside and the outside, unnecessary charge components can be offset. Such example is explained in the following Embodiment 1.

Embodiment 1

Figure 7:
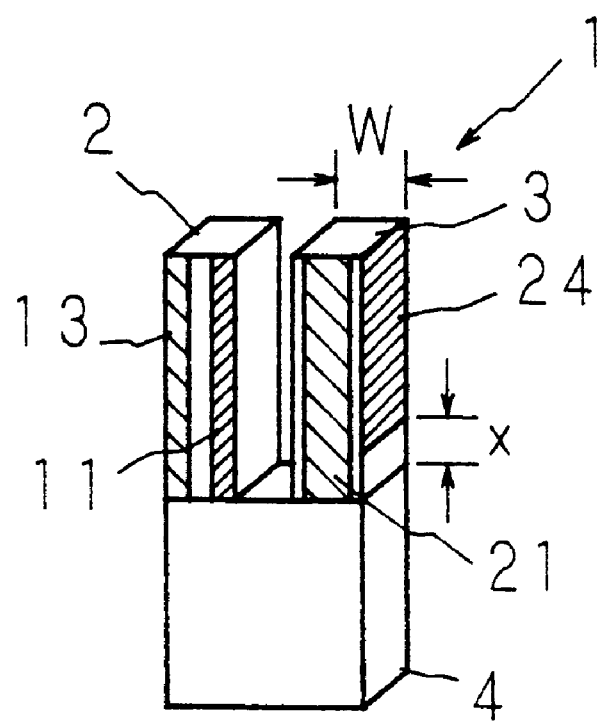
FIG. 7 a perspective view of Embodiment 1.
Figure 8:
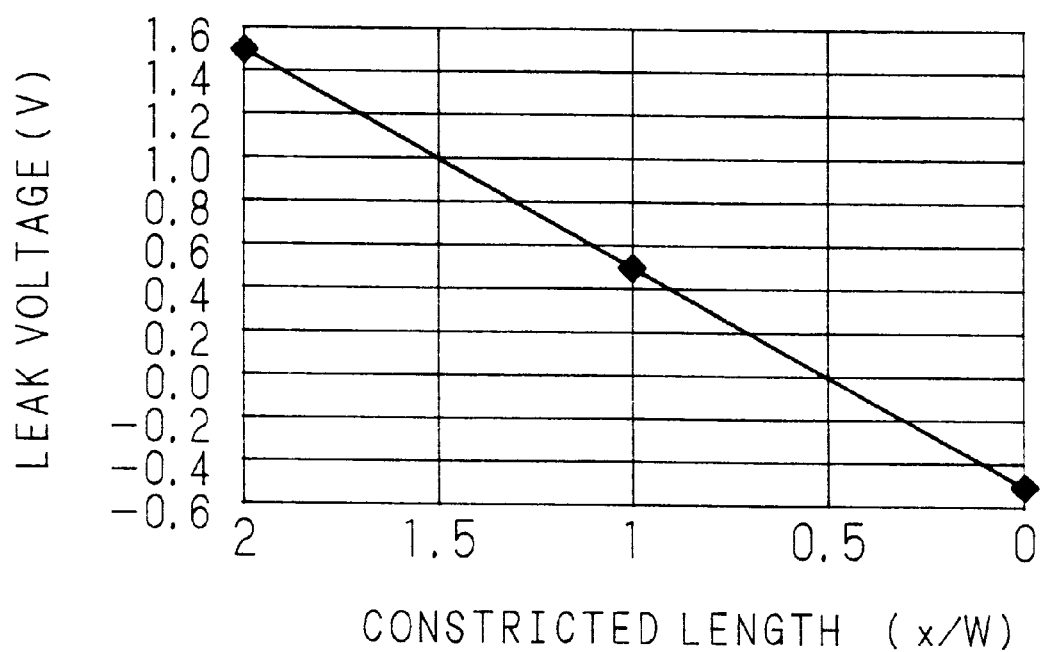
FIG. 8 is a graph showing the relation between the constricted length of the detection electrode and the leak voltage.

FIG. 7 is a perspective view showing Embodiment 1, wherein only the detection electrode 24 provided on the outside lateral face of the arm 3 is shorter on the base 4 side by x than other three detection electrodes. FIG. 8 is a graph to show the change of the leak voltage in the case where the length of the detection electrode 24 is changed. The abscissa shows a constricted length (ratio of lacking length x of the detection electrode 24 from the position of boundary between the arm 3 and the base 4 to the width W of the arm 3, x/W), and the ordinate represents the leak voltage (V) which is generated at the time of the start driving. By changing the length of the detection electrode 24 (0<x/W<2) the level of the leak voltage changes. In case of shortening the detection electrode 24 by x in which x/W is 0.5, the leak voltage becomes the minimum. Accordingly, by making the length of the detection electrode 24 to be provided on the outside lateral face of the arm 3 shorter than the length of the detection electrode 23 (not illustrated in FIG. 7) to be provided on the inside lateral face thereof, it becomes possible to control the leak voltage.

Embodiment 2

Next, an example of lowering the leak voltage by the forming pattern of the detection electrodes 21, 22 to be provided on the surface and reverse face of the arm 3 with the detection electrodes 23, 24 to be provided on the inside lateral face and outside lateral face of the arm 3 being fixed, is explained as Embodiment 2. In such a case, in order to avoid the influence of the extra electric charge on the outside of the arm 3, the detection electrodes 21, 22 to be formed on the surface and reverse face are provided with weights in the widthwise direction and the leak voltage component is reduced.

Figures 9A, 9B:
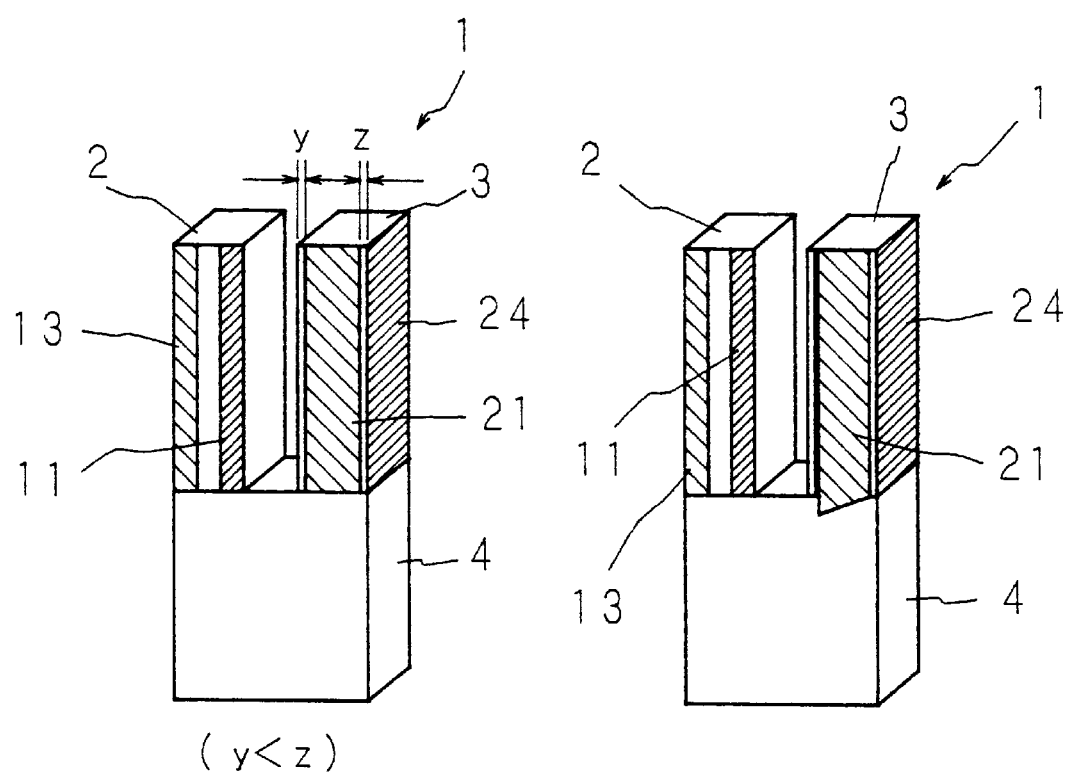
FIGS. 9A, 9B are perspective views of Embodiment 2.

FIG. 9 shows an example of this Embodiment 2. In the example of FIG. 9A, the detection electrodes 21, 22 to be formed on the surface and reverse face of the arm 3 are offset (in case of the distance from the inside lateral face being set as y, and the distance from the outside lateral face being set as z, offsetting is made to y<z). According to the example of FIG. 9B, the shapes of the detection electrodes 21, 22 to be formed on the surface and reverse face of the arm 3 are made to such configurations as to be inclined toward inside from outside.

Next, an example of the case where the shapes of the four drive electrodes provided on the inside and outside of the surface and reverse face of the arm 2 are formed in asymmetric types, or concretely, the size of the inside drive electrode is made smaller than the size of the outside drive electrode so as to suppress the abnormal vibration to a small degree, is explained as the following Embodiment 3 and Embodiment 4.

Embodiment 3

Figure 10:
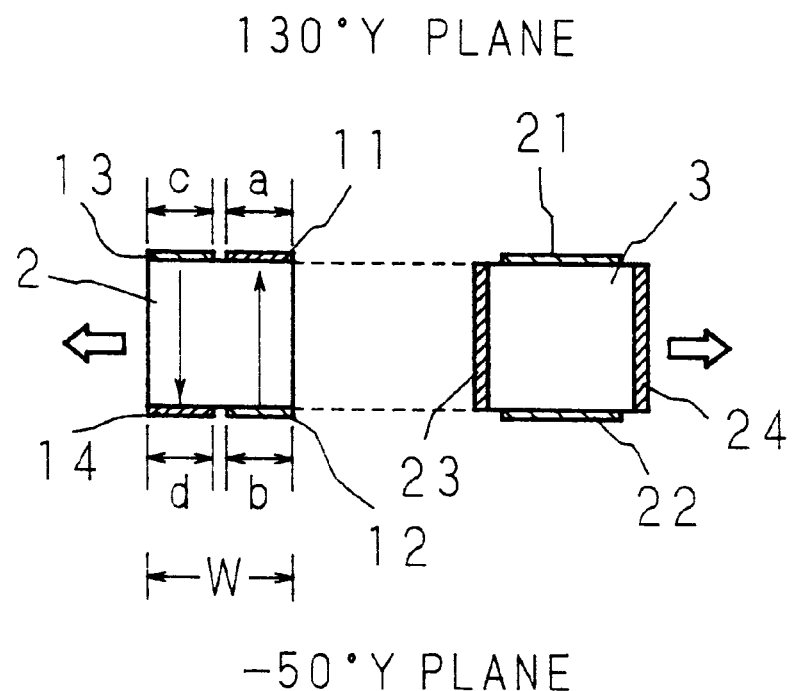
FIG. 10 is a plan view of Embodiment 3.

FIG. 10 is a plan view showing Embodiment 3. The width of the drive electrode to be provided on the inside of the arm 2 is made narrower than the width of the drive electrode to be provided on the outside thereof, by which the abnormal vibration components are made smaller. Concretely, in case the width of the drive electrode 11 to be provided on the inside of the surface of the arm 2 is a, the width of the drive electrode 12 to be provided on the inside of the reverse face is b, the width of the drive electrode 13 to be provided on the outside of the surface is c, and the width of the drive electrode 14 to be provided on the outside of the reverse face is d, the relations are to be a<c, b<d.

Figure 11:
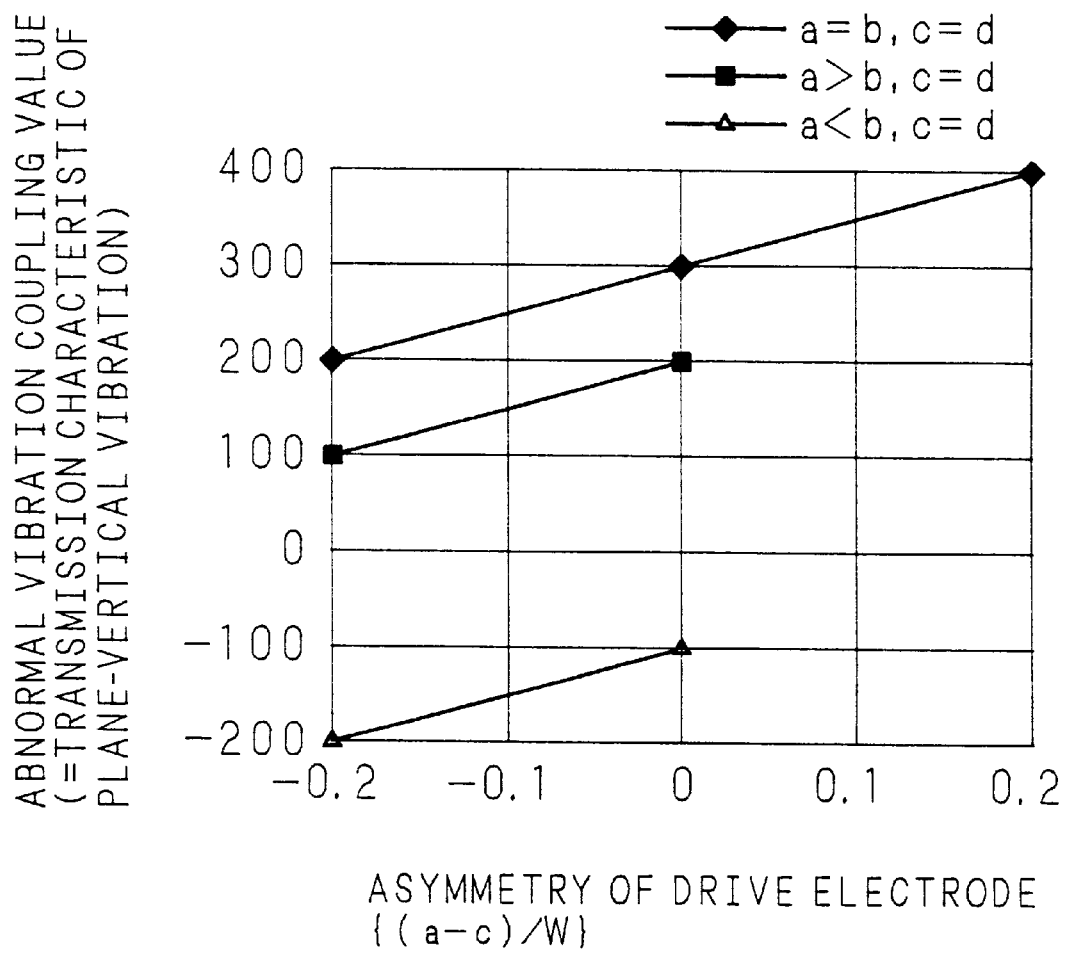
FIG. 11 is a graph showing the relation between the asymmetric property of the drive electrode and the abnormal vibration.

FIG. 11 is a graph showing the change of the abnormal vibration to the asymmetric variation between the inside drive electrode and the outside drive electrode, wherein the abscissa represents the proportion of the difference between a and c to the width W of the arm 2 as asymmetric factor of the drive electrode ((a−c)/W), and the ordinate represents the abnormal vibration coupling value (=transmission characteristic of plane-vertical vibration). In FIG. 11, there are shown the changes of the characteristics relating to the three kinds of the sizes of the widths a, b of the drive electrodes 11, 12 which are to be provided on the inside to the surface and the reverse face of the arm 2. As may be seen from the results of FIG. 11, by differentiating the widths of the drive electrodes 11, 12 on the inside of the surface and the reverse face of the arm 2, the abnormal vibration components can be made much smaller.

Embodiment 4

Figure 12:
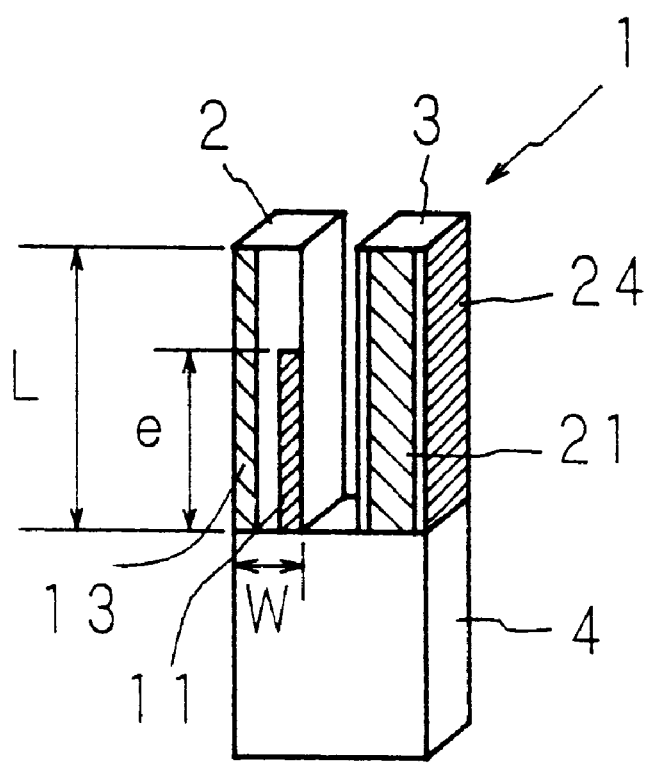
FIG. 12 is perspective view of Embodiment 4.

FIG. 12 is a perspective view to show Embodiment 4. The length of the drive electrode to be provided on the inside of the arm 2 is made shorter than the length of the drive electrode to be provided on the outside thereof, by which the abnormal vibration components are made smaller. Concretely, the outside drive electrodes 13, 14 are formed over the full length of the arm 2, but the inside drive electrodes 11, 12 are formed only in a range from the boundary position between the arm 2 and the base 4 to the intermediate part of the arm 2 (length e).

Figure 13:
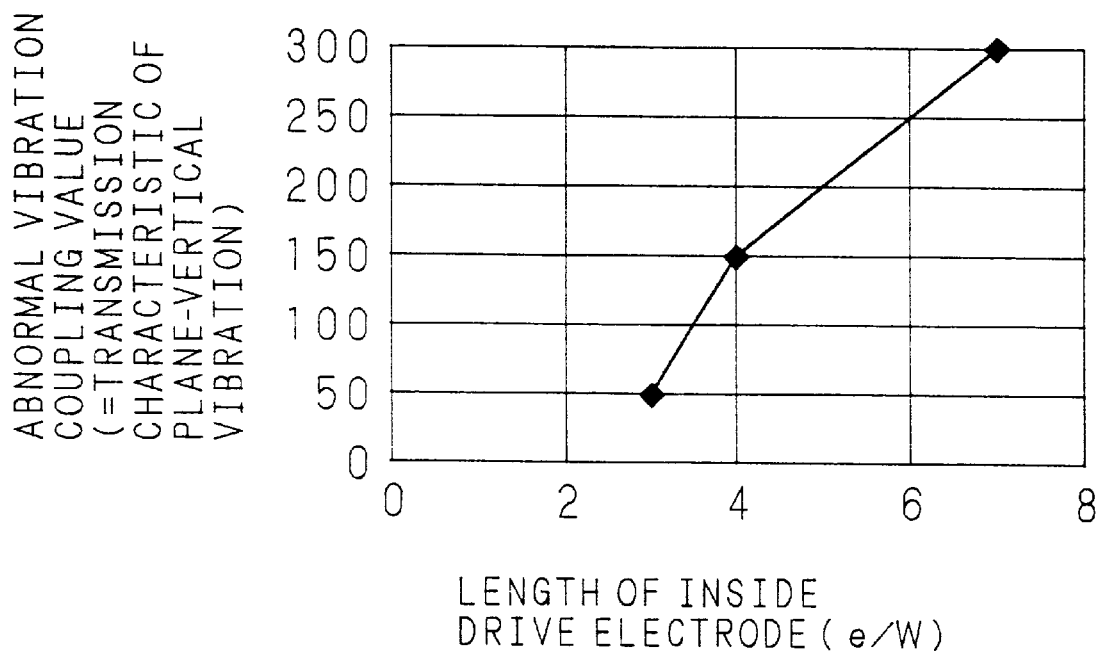
FIG. 13 is a graph showing the relation between the length of the,drive electrode and the abnormal vibration.

FIG. 13 is a graph showing the change of the abnormal vibration to the change of the length of the inside drive electrode, wherein the abscissa represents the length of the inside drive electrode by the proportion of the length e of the inside drive electrode to the width W of the arm 2 (e/W), and the ordinate shows the abnormal vibration coupling value (=transmission characteristic of plane-vertical vibration). It is assumed that the widths of the inside and outside drive electrodes are the same. It can be seen from FIG. 13 that the abnormal vibration component can be suppressed by shortening the length of the inside drive electrode.

Embodiment 5

Figure 14:
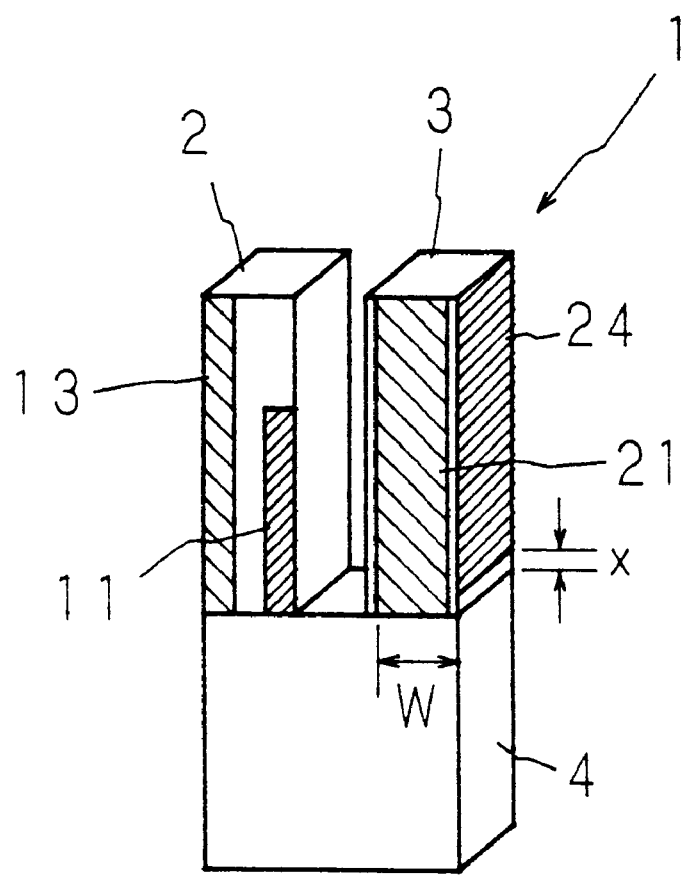
FIG. 14 is a perspective view of Embodiment 5.

FIG. 14 is a constitution view of an asymmetric type tuning fork type vibration gyro reflecting the Embodiments 1 and 4 (asymmetric drive electrode structure and detection electrode structure). The drive electrodes 11, 12 to be provided on the inside of the surface and reverse face of the arm 2 are formed smaller than the drive electrodes 13, 14 which are provided on the outside of the surface and reverse face thereof, and the detection electrode 24 to be provided on the outside lateral face of the arm 3 is formed shorter by x so as to make the amount of x/W 0.5. By adopting such electrode constitution, it becomes possible to delete the effect of abnormal coupling between the drive vibration mode system and the detection vibration mode system.

By the way, as shown in FIG. 5 above, the charge components are concentrated on the boundary part between the arms 2, 3 and the base 4. Accordingly, when an electrode is formed on this part, a tuning fork type vibration member 1 having high efficiency, i.e., having small capacity ratio, can be constituted. As such examples, there are explained Embodiment 6 and Embodiment 7 as follows.

Embodiment 6

Figure 15:
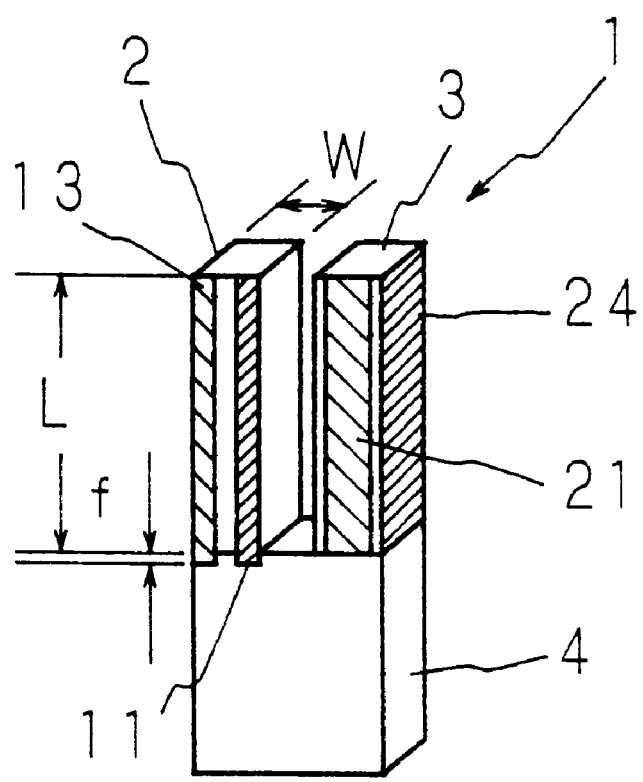
FIG. 15 is a perspective view of Embodiment 6.

FIG. 15 is a perspective view showing the Embodiment 6. The drive electrode is made longer than the arm and extended to a part way into the base, so that the drive efficiency of the drive electrode is high, i.e., capacity ratio is small. Concretely, the four drive electrodes 11, 12, 13, and 14 provided on the arm 2 are formed to extend from the full length zone of the arm 2 part way into the base 4 (the length f extended to the base 4).

Figure 16:
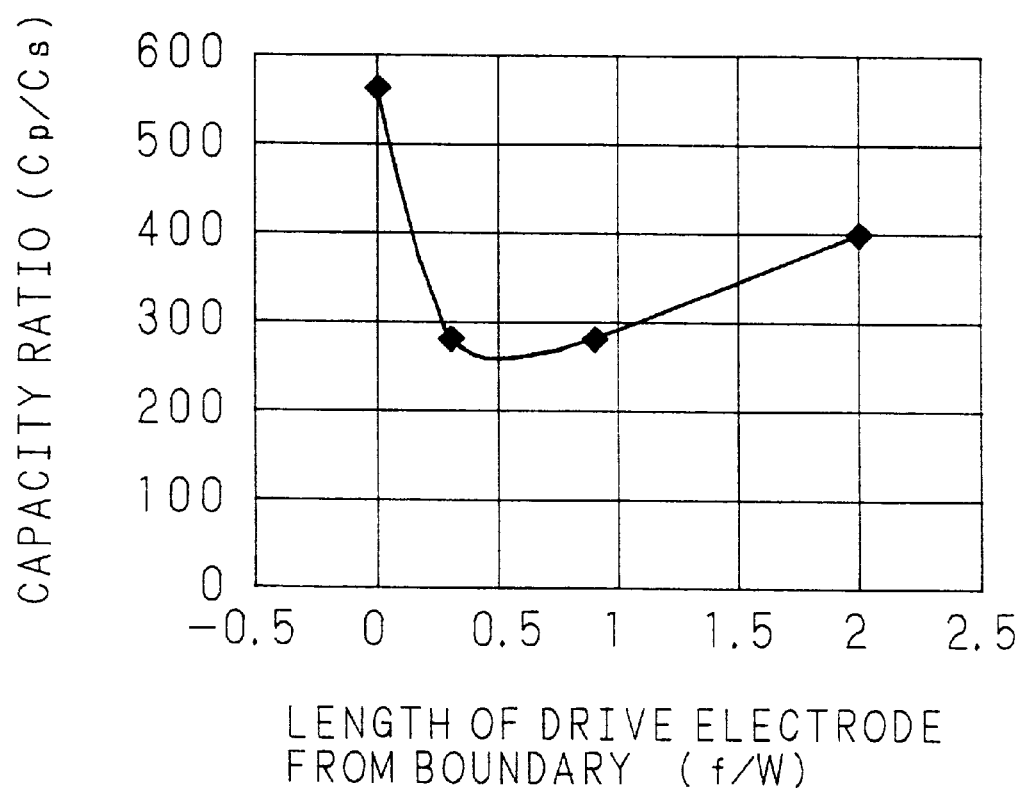
FIG. 16 is a graph showing the relation between the extension length of the drive electrode and the capacity ratio.

FIG. 16 is a graph showing the change of the capacity ratio to the change of the extension lengths of the drive electrodes 11, 12, 13 and 14 from the boundary position between the arm 2 and the base 4, wherein the abscissa represents the lengths of the drive electrodes 11, 12, 13 and 14 from the boundary position by the ratio of the extension length f to the width W of the arm 2 (f/W), and the ordinate represents a capacity ratio of the drive electrode (Cp/Cs). The amount of f/W shows a low capacity ratio in the range of 0 to 2, and in the case where the amount of f/W is about 0.5, the smallest capacity ratio is obtainable.

Embodiment 7

Figure 17:
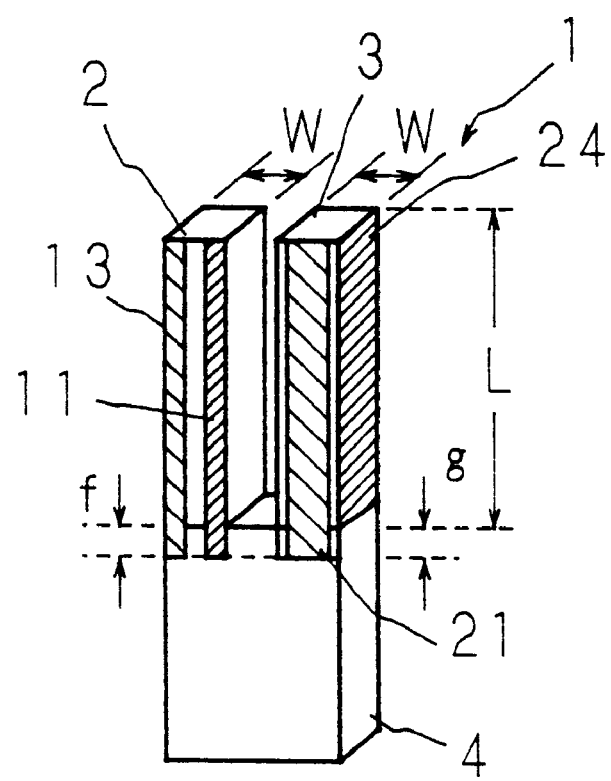
FIG. 17 is a perspective view of Embodiment 7.

FIG. 17 is a perspective view showing the Embodiment 7. The detection electrode is made longer than the arm to be extended part way of the base so as to make the detection efficiency of the detection electrode high, i.e., to make the capacity ratio small. Concretely, the two detection electrodes 21, 22 provided on the surface and reverse face of the arm 3 are formed from the full length of the arm 3 part way into the base 4 (the length g extended to the base 4). The four drive electrodes 11, 12, 13, and 14 are also extended beyond the base 4 by f from the full length of the arm 2 in the same manner as in the Embodiment 6.

Figure 18:
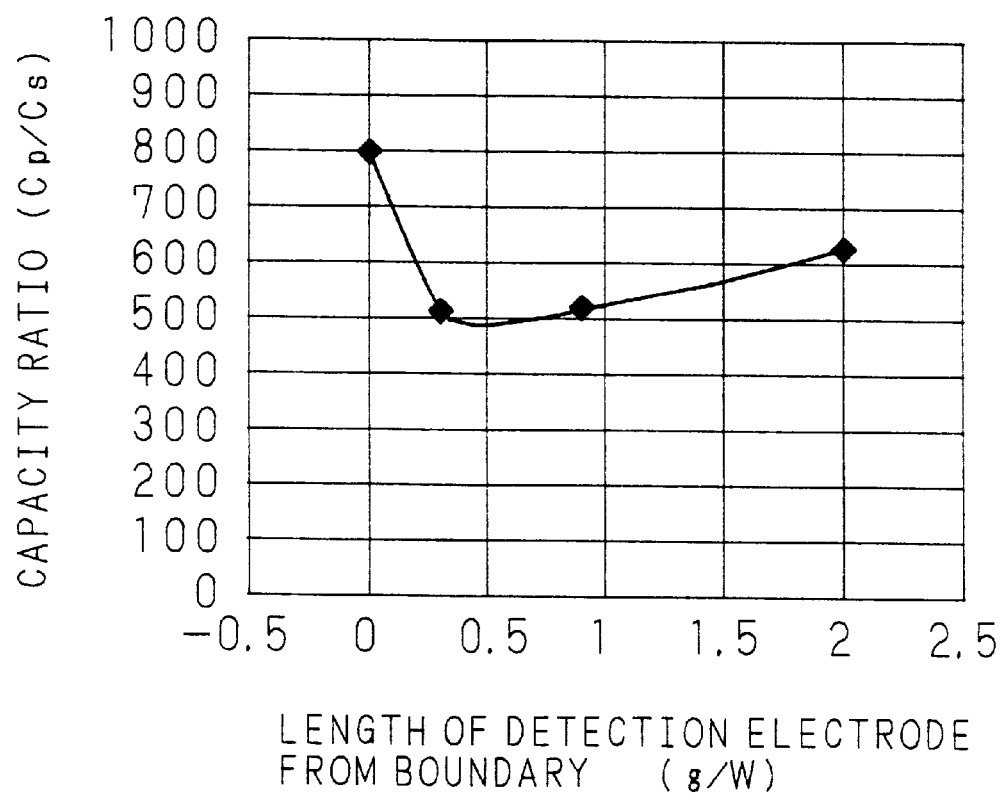
FIG. 18 is a graph showing the relation between the extension length of the detection electrode and the capacity ratio.

FIG. 18 is a graph showing the change of the capacity ratio to the change of the extension lengths of the detection electrodes 21, 22 from the boundary position between the arm 3 and the base 4, wherein the abscissa represents the length of the detection electrode from the boundary position by the ratio of the extension length g to the width W of the arm 3 (g/W), and the ordinate represents the capacity ratio of the detection electrode (Cp/Cs). The amount of g/W shows a low capacity ratio in the range of 0 to 2, and the smallest capacity ratio is obtainable in the case where the g/W amount is about 0.5.

Embodiment 8

Figure 19:
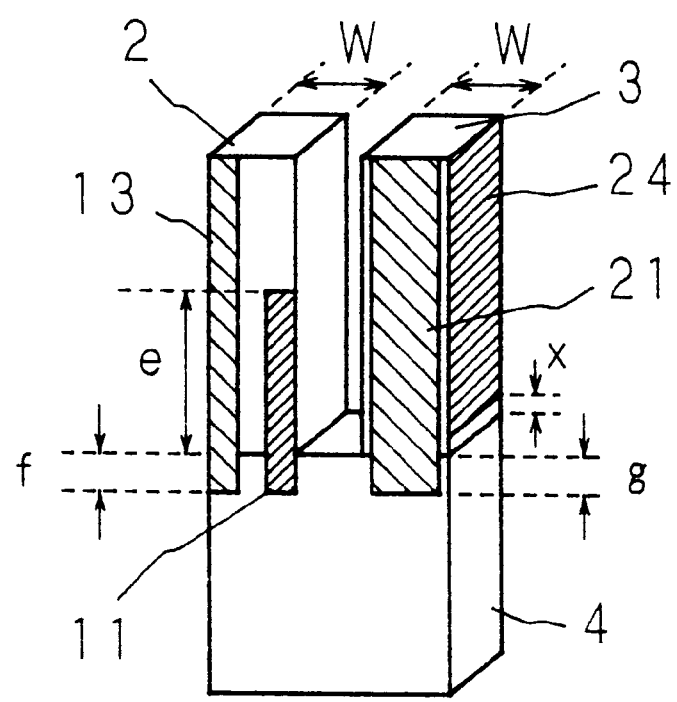
FIG. 19 is a perspective view of Embodiment 8.

FIG. 19 is a constitution view of an asymmetric type tuning fork type vibration gyro reflecting the Embodiments 1, 2, 6 and 7 above (asymmetric drive electrode structure and detection electrode structure). By forming the drive electrodes 11, 12 to be provided on the inside of the arm 2 smaller than the outside drive electrodes 13, 14. The detection electrode 24 to be provided on the outside lateral face of the arm 3 is formed shorter by x so as to make the x/W amount 0.5, and the respective drive electrodes 11, 12, 13 and 14 to be provided on the arm 2 are extended the beyond base 4 side by the distance f so as to make the f/W amount 0.5, and the detection electrodes 21, 22 beyond be provided on the surface and reverse face of the arm 3 are extended beyond the base 4 side by the distance g so that the amount of g/W is 0.5. By so setting, it becomes possible to delete the effect of abnormal coupling between the drive vibration mode system and the detection vibration mode system.

[Symmetric type tuning fork type vibration gyro]

Figure 22:
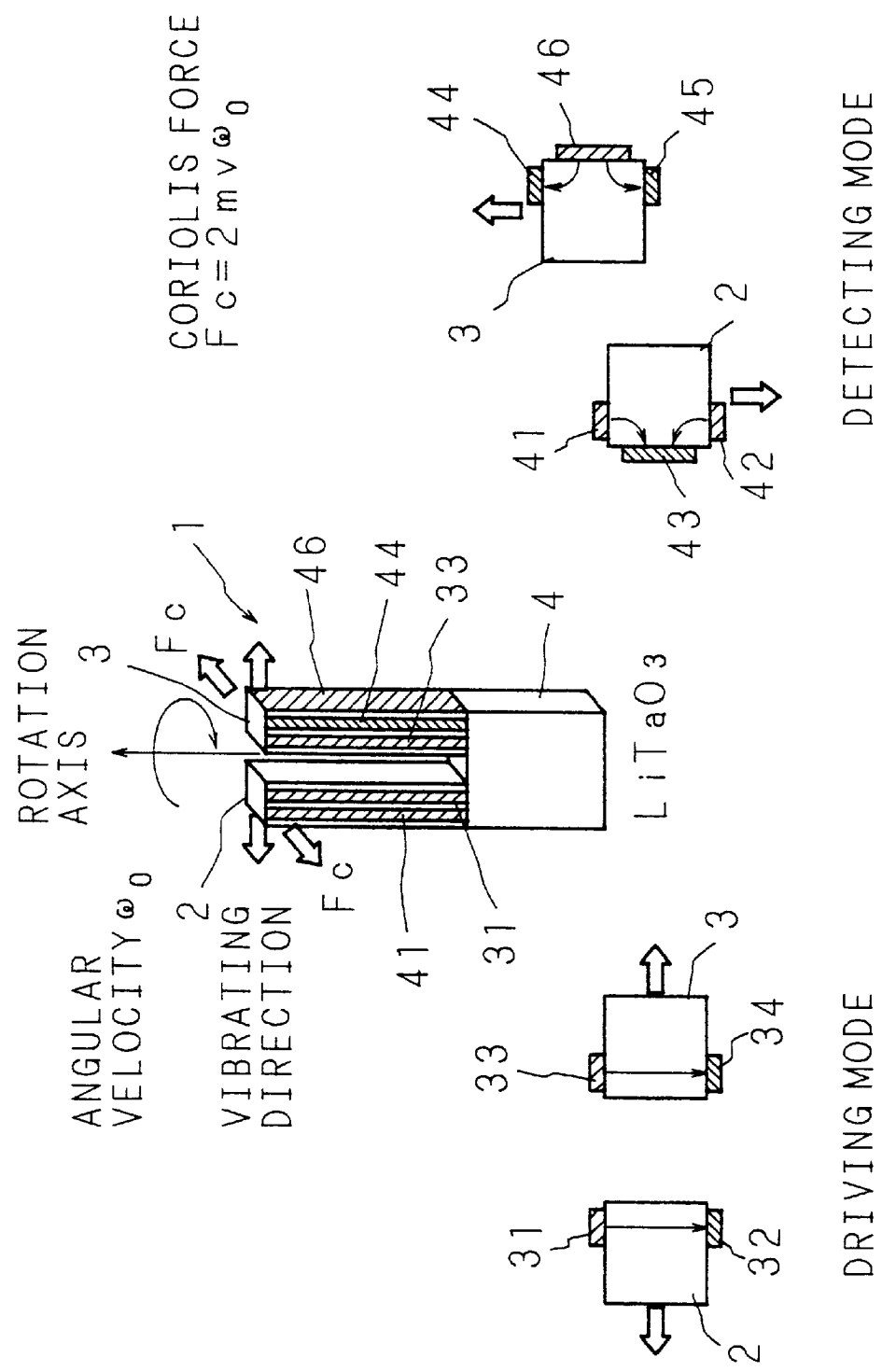
FIG. 22 is a constitution view of symmetric type tuning fork type vibration gyro.

Next, the general constitution and detection principle in the symmetric type tuning fork type vibration gyro are explained with reference to FIGS. 20–22. FIGS. 20 and 21 are the views to show the electrode constitution, and FIG. 22 is a view to show the concrete electrode pattern.

The symmetric type tuning fork type vibration member 1 also has two arms 2, 3 of rectangular parallelepiped forms having square bottom faces and a base 4 of rectangular parallelepiped form which supports the two arms 2 and 3. These arms 2, 3 and base 4 are molded in one-piece by piezoelectric monocrystal, wherein the type tuning fork type vibration member 1 is driven by the fx mode vibration, and by carrying out the detection by the fy mode vibration, the output by Coriolis force is to be detected. However, the installation patterns of the drive electrode and detection electrode are different from those of the asymmetric type ones.

Figure 20A:
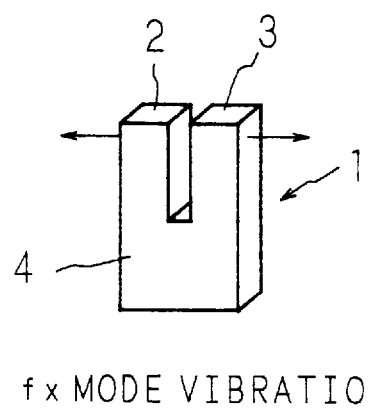
FIGS. 20A, 20B are-explanatory views of the electrode constitution for inducing in-plane vibration (drive vibration)
Figure 20B:
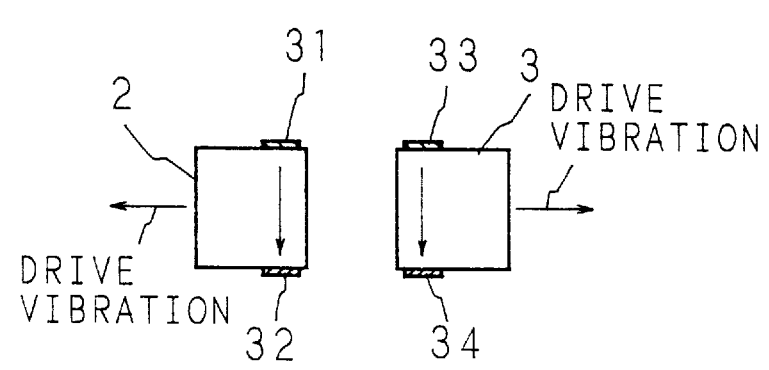

FIG. 20 is a view to illustrate the electrode for driving the fx mode vibration. On the inside parts of the surface and reverse face of the arms 2, 3 shown in FIG. 20A, there are provided the drive electrodes 31, 32, 33, and 34 as shown in FIG. 20B, and when a voltage is applied to the space between the drive electrodes 31, 32 and the drive electrodes 33, 34, an electric field is generated as shown in the arrow marks in FIG. 20B, and by the piezoelectric effect as indicated in arrow in FIG. 20A, the outside parts of the arms 2,3 show the elongating and shrinking movements. By these elongating and shrinking movements the fx mode vibration can be excited on the arms 2,3.

When rotary movements are formed on the vibration shaft of the fx mode vibration, the Coriolis force is generated in the direction vertical to the vibration direction. Therefore, as shown in FIG. 21B, the detection electrodes 41, 42, 43 are provided on the outside lateral face and the outside of the surface and reverse face of the arm 2, and the detection electrodes 44, 45, 46 are provided on the outside lateral face and the outside of the surface and reverse face of the arm 3, by which the fy mode vibration as shown in the arrow mark of FIG. 21A is detected in the direction vertical to the fx mode vibration, by which the electric outputs proportionate to the angular velocity can be obtained from the arms 2, 3 which show warping in the reverse directions to each other.

By the principles as described above, the general constitution of the symmetric type tuning fork type vibration gyro is as shown in FIG. 22. The tuning fork type vibration member 1 which is a tuning fork type vibration gyro of the invention has the two arms 2, 3 (width W, length L) and a base 4 which are constituted in one-piece with $LiTaO_3$. On the inside of the surface and reverse face of one arm 2, there are provided a set of drive electrodes 31, 32 for driving the above fx mode vibration, and on the outside of the surface and reverse face thereof and the outside lateral face thereof, there are provided the detection electrodes 41, 42, 43 for detecting the above fy mode vibration. Also, on the inside of the surface and reverse face of the other arm 3, there are provided a set of drive electrodes 33, 34 for driving the above fx mode vibration, and on the outside of the surface and reverse face thereof and the outside lateral face thereof, there are provided the detection electrodes 44, 45, 46 for detecting the above fy mode vibration. As such, in the symmetric type tuning fork type vibration gyro, in the two arms 2, 3, the drive electrode and detection electrode are provided in symmetric relations.

In the symmetric type tuning fork type vibration gyro, because the drive electrode and detection electrode are provided in symmetric relations on the two arms 2, 3, abnormal vibration can be offset, and the leaking output is small. Consequently, in order to elevate the detection precision, i.e., S/N ratio, suppression of noise signal (N component) need not be considered, but it is necessary to enhance the detection signal (S component). Accordingly, by contriving the shapes of the drive electrode and detection electrode, the capacity ratio of the drive electrode to the detection electrode is lowered to improve the detection efficiency, and with respect to such examples explanation is given in the following Embodiments 9–13.

Embodiment 9

Figure 23:
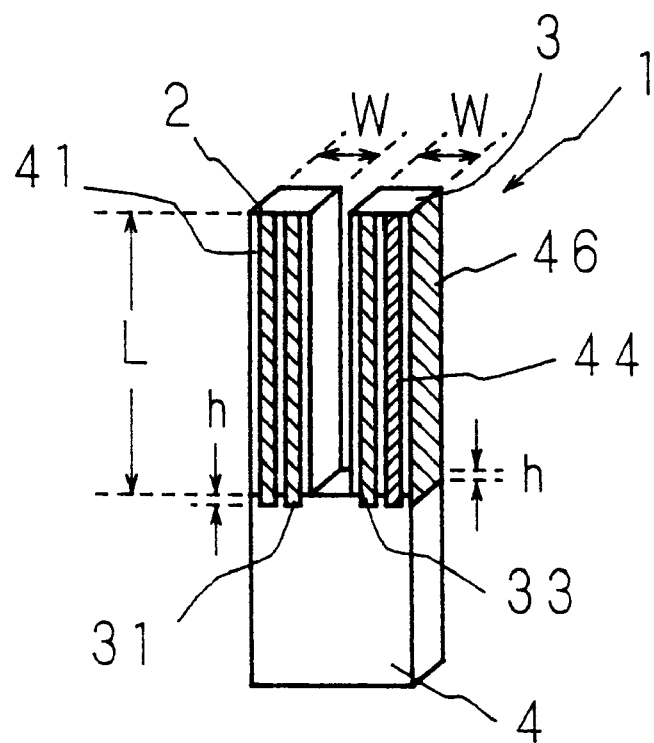
FIG. 23 is a perspective view of Embodiment 9.

In the case of the symmetric type tuning fork type vibration gyro, the electric charge components are concentrated on the boundary part between the arms 2, 3 and the base 4. Accordingly, when an electrode is formed on the portion, there can be made a tuning fork type vibration member 1 having high efficiency, i.e., small capacity ratio. FIG. 23 is a perspective view showing Embodiment 9. By making the drive electrode and the detection electrode longer than the arm so as to extend part way into of the base, it is so made that the drive efficiency of the drive electrode and the detection efficiency of the detection electrode are made high, i.e., its capacity ratio becomes small. Concretely, the four drive electrodes 31, 32, 33, 34 and six detection electrodes 41, 42, 43, 44, 45, 46 are formed over the areas from the full length (L) of the arms 2, 3 part way into the base 4 (length h extended to the base 4).

Figure 24:
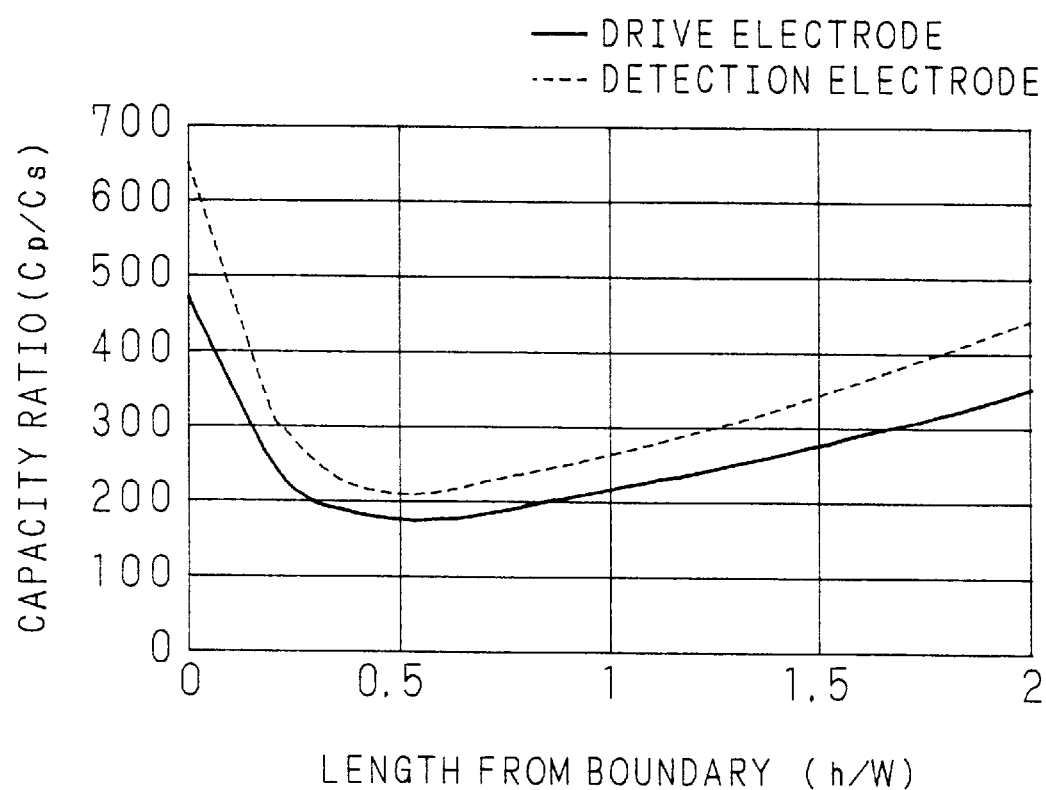
FIG. 24 is a graph showing the relation between the extension lengths of the drive electrode and detection electrode and the capacity ratio.

FIG. 24 is a graph to show the change of the capacity ratio to the changes of the extension lengths of the drive electrode and the detected electrode, from the boundary position between the arms 2, 3 and the base 4, wherein the abscissa represents the lengths of the drive electrode and the detection electrode from the base arm boundary position by the ratio (h/W) of the extension length h to the width W of the arms 2, 3, and the ordinate represents the capacity ratio (Cp/Cs) of the drive electrode and the detection electrode. In the case of the drive electrode, the capacity ratio is low in the range of 0–2 of the h/W value, and the smallest capacity ratio is obtainable at the time when the h/W value is 0.5. In the case of the detection electrode, the capacity ratio is low within the range of the h/W value being 0–2, and the smallest capacity ratio is obtainable when the h/W value is 0.5.

Embodiment 10

Figure 25:
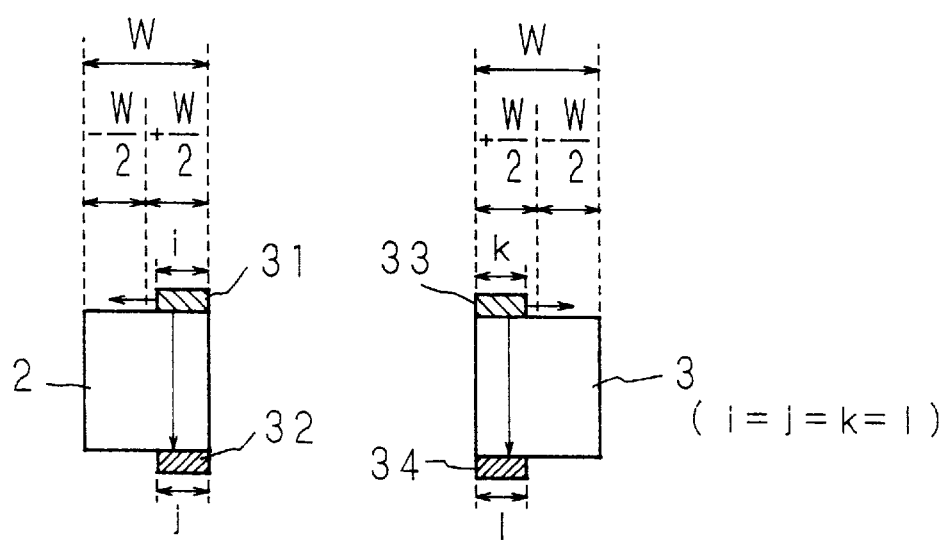
FIG. 25 is a plan view of Embodiment 10.

Explanation is given on the relation between the widths (forming positions) of the drive electrodes 31, 32, 33, 34 to be provided on the inside of the surface and the reverse face of the arms 2, 3 and the capacity ratio. As shown in FIG. 25, in case the widths of the drive electrodes 31, 32, 33, 34 are set to be i, j, k, l, respectively, while keeping the condition of i=j=k=l, the widths are varied to examine the change of the capacity ratios, and the results are shown in FIG. 26.

Figure 26:
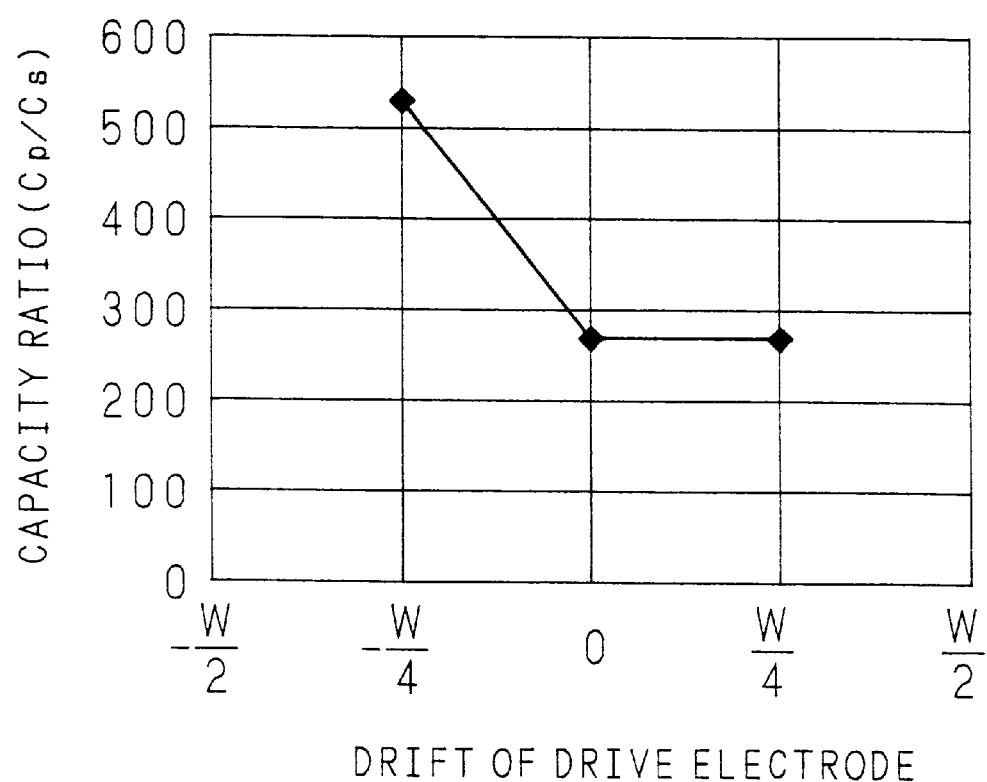
FIG. 26 is a graph showing the relation between the width of the drive electrode and the capacity ratio.

In the graph of FIG. 26, the abscissa represents the amount of drift at the tip of the drive electrode from the center line of the arm, and the ordinate represents the capacity ratio of the drive electrode (Cp/Cs). The value of 0 in the abscissa indicates that the width of the drive electrode is only half the arm width W, i.e., the tip of the drive electrode extending from the inside periphery of the arm reaches the center line of the arm. The scale of the abscissa is taken according to the extent of drift of the tip position of the drive electrode from the center line of the arm (drift to inside is + direction, and drift to outside is − direction). For example, ¼ W shows the case where the tip of the drive electrode reaches only to the position of ¼ W before the center line, and the width thereof is ¼ W , and −¼ W shows the case where the tip of the drive electrode extends beyond the center line further to ¼ W , and its width is ¾ W .

It can be observed from the results of FIG. 26 that, when the drive electrode exceeds the center line of the arm, the capacity ratio increases to give deterioration of characteristics. Accordingly, it is necessary for the drive electrodes 31, 32, 33, 34 not to go beyond the center lines of the arms 2, 3.

Embodiment 11

Figure 27:
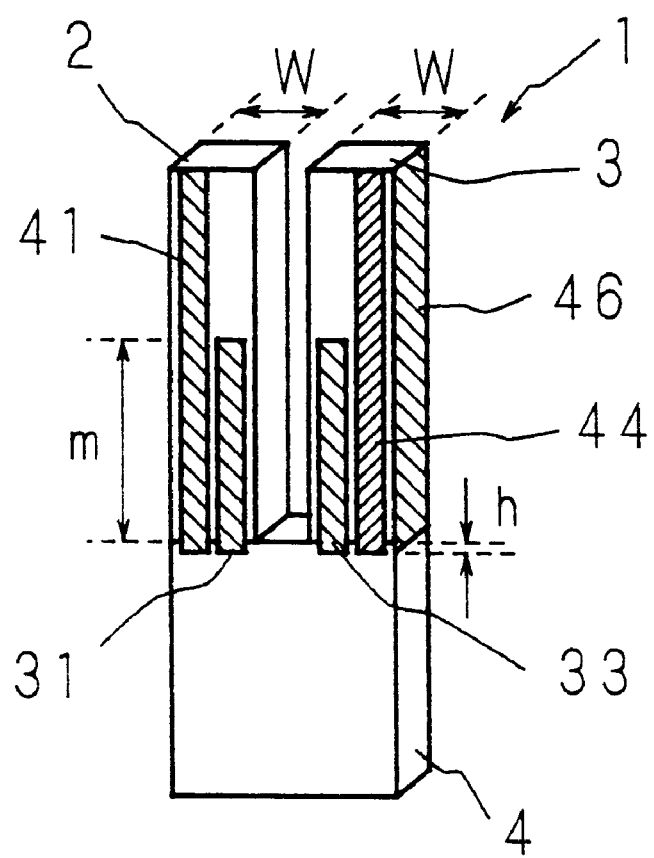
FIG. 27 is a perspective view of Embodiment 11.

FIG. 27 is a perspective view showing Embodiment 11. The lengths of the drive electrodes to be provided on the inside of the surface and the reverse face of the arm are made short. The detection electrodes 41, 42, 43, 44, 45, 46 are formed over the full length of the arms 2, 3, but the drive electrodes 31, 32, 33, 34 are formed only from the boundary position between the arms 2, 3 and the base 4 to the midway of the arms 2, 3 (length, m). These drive electrodes 31, 32, 33, 34 and detection electrodes 41, 42, 43, 44, 45, 46 are provided in extension by the length h (h/W=0.5) from the boundary position between the arms 2, 3 and the base 4 to beyond the base 4. The widths of the drive electrodes 31, 32, 33, 34 are to be the same.

Figure 28:
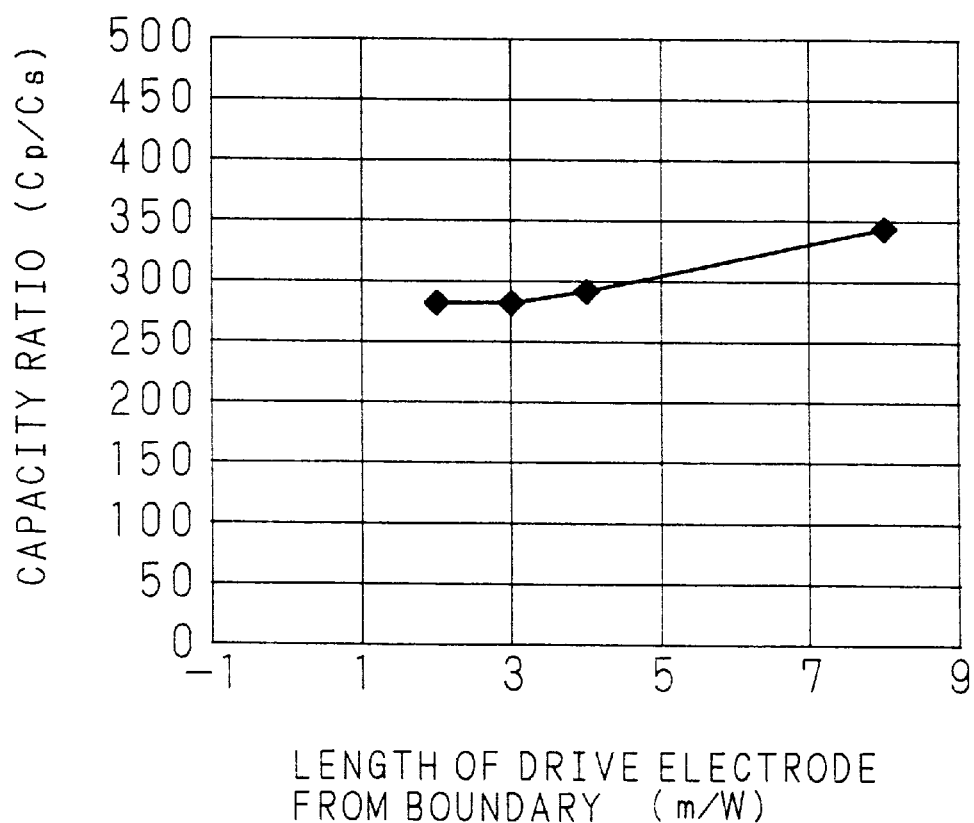
FIG. 28 is a graph showing the relation between the length of the drive electrode and the capacity ratio.

FIG. 28 is a graph showing the change of the capacity ratio to the change of the length of the drive electrode, wherein the abscissa represents the length of the drive electrode from the boundary position by the ratio (m/W) of the length m of the drive electrode to the width W of the arms 2, 3, and the ordinate represents the capacity ratio (Cp/Cs) of the drive electrode. From the results of FIG. 28, it is observed that the setting can be made to a small capacity ratio by making the value of m/W larger than 2, and improvement of drive efficiency can be expected.

Embodiment 12

Figure 29:
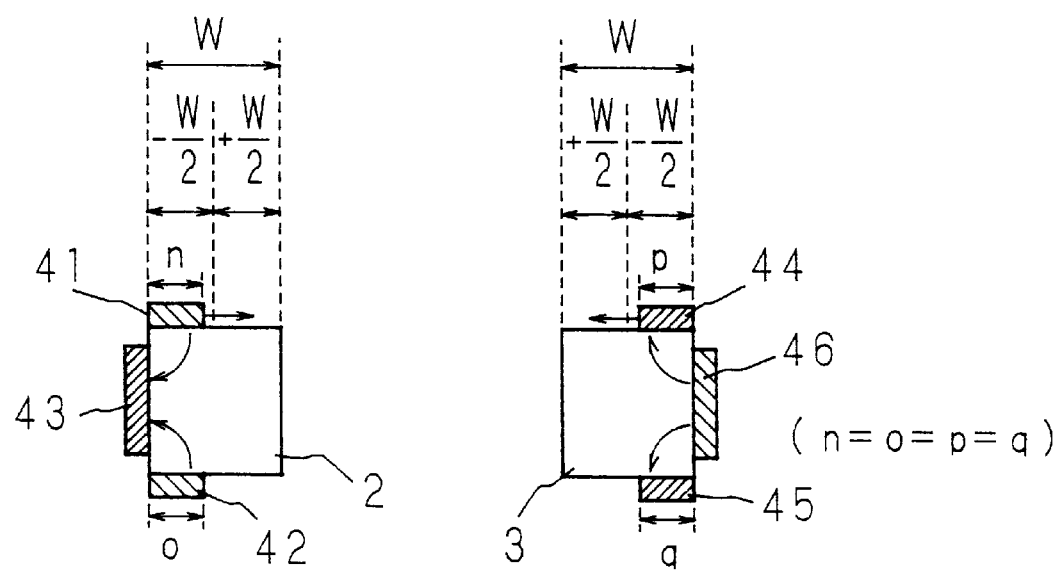
FIG. 29 is a plan view of Embodiment 12.

Explanation is given on the relation between the widths (forming positions) of the detection electrodes 41, 42, 44, 45 to be provided on the outside of the surface and the reverse face of the arms 2, 3 and the capacity ratio. As shown in FIG. 29, in case the widths of the detection electrodes 41, 42, 44, 45 are set to be n, o, p, q, respectively, while keeping the condition of n=o=p=q, the widths are varied to examine the change of the capacity ratios, and the results are shown in FIG. 30.

Figure 30:
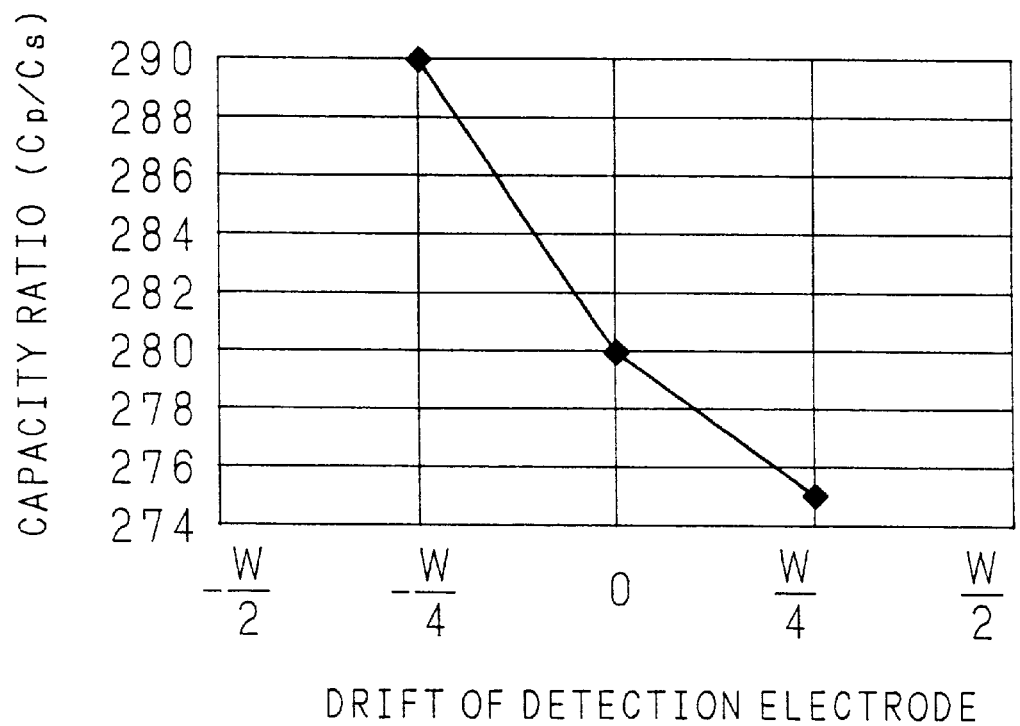
FIG. 30 is a graph showing the relation between the width of the detection electrode and the capacity ratio.

In the graph of FIG. 30, the abscissa represents the amount of drift at the tip of the detection electrode from the center line of the arm, and the ordinate represents the capacity ratio of the detection electrode (Cp/Cs). The value of 0 in the abscissa indicates that the width of the detection electrode is only half the arm width W, i.e., the tip of the detection electrode extending from the outside periphery of the arm reaches the center line of the arm. The scale of the abscissa is taken according to the extent of drift of the tip position of the detection electrode from the center line of the arm (drift to inside is + direction, and drift to outside is − direction). For example, ¼ W shows the case where the tip of the detection electrode extends beyond the center line further to ¼ W , and its width is ¾ W, and −¼ W shows the case where the tip of the detection electrode reaches only to the position of ¼ W before the center line, and its width is ¼ W .

It can be observed from the results of FIG. 30 that, different from the case of the drive electrode mentioned above, whether the detection electrode exceeds the center line of the arm or not is not such as important problem, but the detection electrode can be set to a small capacity ratio by making the widths of the detection electrodes 41, 42, 44, 45 to more than ¼ of the width of the arms 2, 3, namely, to more than ¼ W, and improvement of the detection efficiency can be expected.

Embodiment 13

Figure 31:
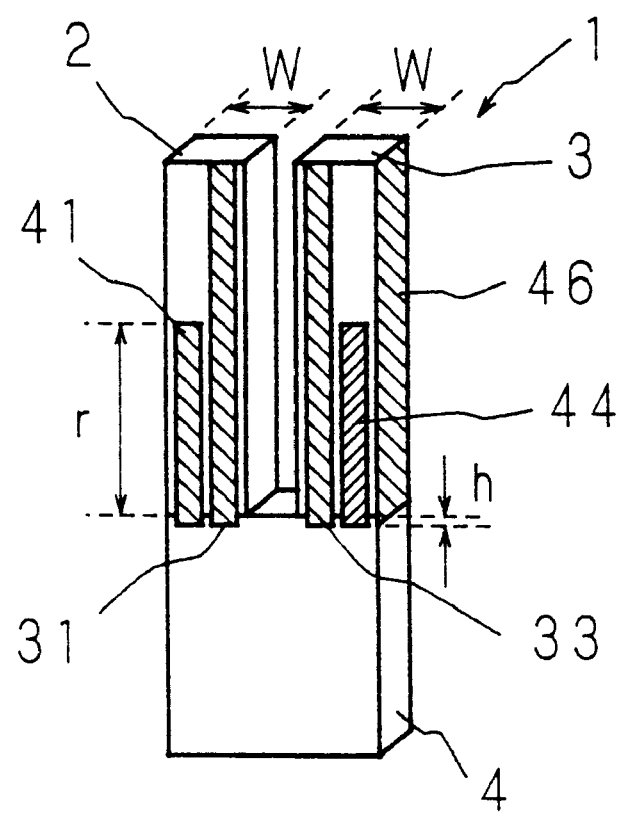
FIG. 31 is a perspective view of Embodiment 13.

FIG. 31 is a perspective view showing Embodiment 13. The lengths of the detection electrodes to be provided on the outside of the surface and the reverse face of the arm are made short. Concretely, the detection electrodes 43, 46 to be formed on the outside lateral face of the arms 2, 3 and the drive electrodes 31, 32, 33, 34 to be formed on the inside of the surface and the reverse face of the arms 2, 3 are formed over the full length of the arms 2, 3, but the detection electrodes 41, 42, 44, 45 to be formed on the outside of the surface and the reverse face of the arms 2, 3 are formed only up to the half-way of the arms 2, 3 (length r from the boundary position between the arms 2, 3 and the base 4). These drive electrodes 31, 32, 33, 34 and detection electrodes 41, 42, 43, 44, 45, 46 are provided in extension by the length h (h/W=0.5) from the boundary position between the arms 2, 3 and the base 4 to beyond the base 4. The widths of the detection electrodes 41, 42, 44, 45 are to be the same.

Figure 32:
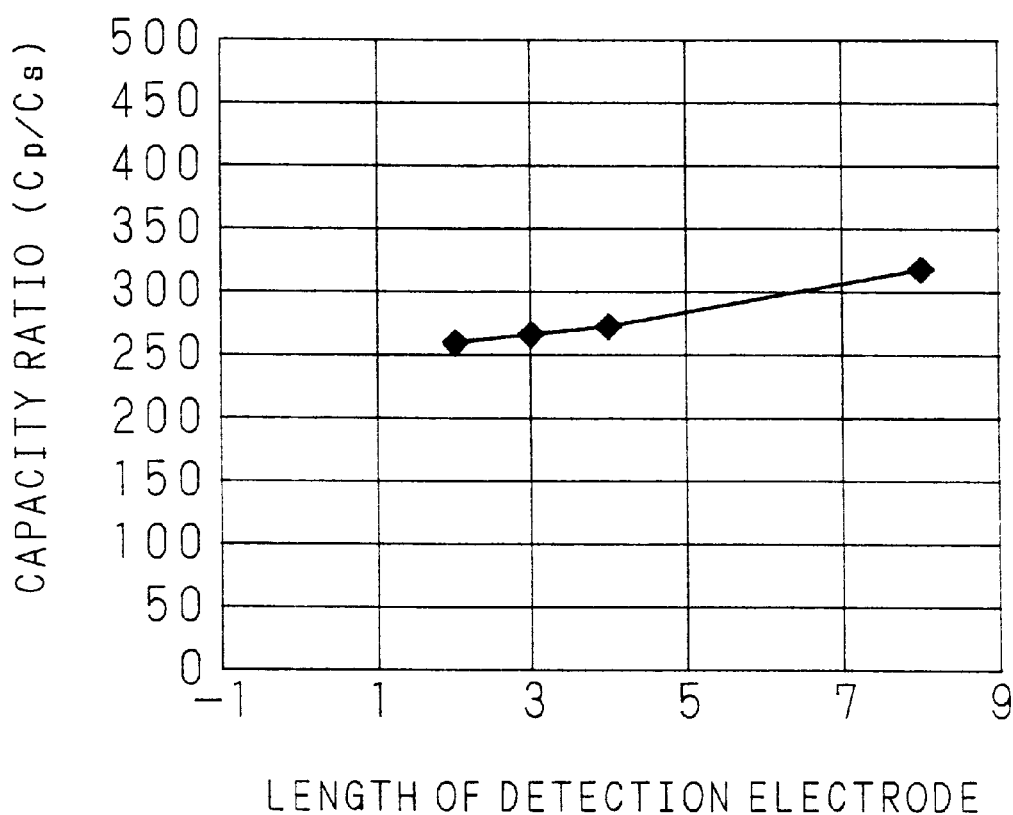
FIG. 32 is a graph showing the relation between the length of the detection electrode and the capacity ratio.

FIG. 32 is a graph showing the change of the capacity ratio to the change of the length of the detection electrode, wherein the abscissa represents the length of the detection electrode from the boundary position by the ratio (r/W) of the length r of the detection electrode to the width W of the arms 2, 3, and the ordinate represents the capacity ratio (Cp/Cs) of the detection electrode. From the results of FIG. 32, it is observed that the setting can be made to a small capacity ratio by making the value of r/W larger than 2, and improvement of detection efficiency can be expected.

In the foregoing embodiments, $LiTaO_3$ is used as a piezoelectric monocrystal, but there may be used the piezoelectric monocrystal of other material such as $LiNbO_3$ (Y'=50°Y) as the piezoelectric monocrystal.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A tuning fork type vibration gyro, comprising:

a first arm comprising a piezoelectric crystal;

a second arm comprising a piezoelectric crystal;

a base comprising a piezoelectric crystal and supporting said first arm and second arm;

drive electrodes provided on said first arm and said second arm, for generating tuning fork vibration; and detection electrodes provided on said first arm and said second arm, for detecting the electromotive force generated by Coriolis force, wherein said drive electrodes extend beyond said base, and wherein, when the width of said first arm and said second arm is W, and the extension length of said drive electrodes extending over said base is h, the relation satisfies: 0 <h/W<2.

2. The tuning fork type vibration gyro according to claim 1, wherein said drive electrodes are provided so as not to exceed the center lines in the width direction of said first arm and said second arm.

3. The tuning fork type vibration gyro according to claim 1, wherein, when the width of said first arm and said second arm is set to be W, and the length of said drive electrodes from the boundary position between said first and second arms and said base to be m, the relation satisfies: m/W>2.

4. A tuning fork type vibration gyro comprising:

a first arm comprising a piezoelectric crystal;

a second arm comprising a piezoelectric crystal;

a base comprising a piezoelectric crystal and supporting said first arm and second arm;

drive electrodes provided on said first arm and said second arm, for generating tuning fork vibration; and detection electrodes provided on said first arm and said second arm, for detecting the electromotive force generated by Coriolis force, wherein said detection electrodes extend beyon said base, and wherein, when the width of said first arm and said second arm is W, and the extension length of said drive electrodes extending over said base is h, the relation satisfies: 0<h/W<2.

5. The tuning fork type vibration gyro according to claim 4, wherein the width of said detection electrodes is more than ¼ of the width of said first arm and said second arm.

6. The tuning fork type vibration gyro according to claim 4, wherein, when the width of said first arm and said second arm is set to be W, and the length of said detection electrodes from the boundary position between said first and second arms and said base to be r, the relation satisfies: r/W>2.

7. A tuning fork type vibration gyro comprising:

a first arm comprising a piezoelectric crystal;

a second arm comprising a piezoelectric crystal;

a base comprising a piezoelectric crystal and supporting said first arm and second arm;

drive electrodes provided on said first arm and said second arm, for generating tuning fork vibration; and detection electrodes provided on said first arm and said second arm, for detecting the electromotive force generated by Coriolis force, wherein said drive electrodes and said detection electrodes extend beyond said base, and wherein, when the width of said first arm and said second arm is W, and the extension length of said drive electrodes extending over said base is h, the relation satisfies: 0<h/W<2.

* * * * *